United States Patent [19]
Sicola et al.

[11] Patent Number: 5,938,776
[45] Date of Patent: Aug. 17, 1999

[54] DETECTION OF SCSI DEVICES AT ILLEGAL LOCATIONS

[75] Inventors: Stephen J. Sicola, Monument; Bruce Sardeson, Colorado Springs; Frank M. Nemeth, Colorado Springs; Mike Hare, Colorado Springs; Brian Schow, Colorado Springs, all of Colo.

[73] Assignee: Digital Equipment Corporation, Houston, Tex.

[21] Appl. No.: 08/883,782

[22] Filed: Jun. 27, 1997

[51] Int. Cl.$^6$ .............................. G06F 11/00; G06F 13/00; G06F 13/40
[52] U.S. Cl. .............................. 714/25; 710/101; 710/126; 710/2; 710/3; 710/9
[58] Field of Search ............................... 395/183.01, 829, 395/823, 822, 281, 306

[56] References Cited

U.S. PATENT DOCUMENTS

| | | | |
|---|---|---|---|
| 5,239,632 | 8/1993 | Larner | 395/325 |
| 5,594,879 | 1/1997 | Belmont | 395/309 |
| 5,596,727 | 1/1997 | Literati et al. | 395/281 |
| 5,751,977 | 5/1998 | Alexander | 395/306 |

*Primary Examiner*—Robert W. Beausoliel, Jr.
*Assistant Examiner*—Brian H. Shaw
*Attorney, Agent, or Firm*—Homer L. Knearl; William J. Kubida; Holland & Hart LLP

[57] ABSTRACT

In a SCSI subsystem having mixed wide and narrow SCSI devices installed, a method and apparatus is provided for detecting a narrow SCSI device illegally installed at a slot assigned to a wide SCSI device. To detect the narrow SCSI device installed at an illegal location, high ID and low ID SCSI bus address pairs are set as test pairs for the SCSI subsystem. The low ID is the alias of the high ID if a narrow SCSI device is installed at the high ID slot. To detect a conflict with a controller ID, a non-responsive ID bus address corresponding to a slot known to be unused is called. A response to this call indicates a narrow SCSI device is installed at the high ID of the test pair and the narrow SCSI device at the high ID has configured to an alias bus address matching the controller ID. To detect a present conflict between SCSI devices, the low ID bus address in the test pair is called. A conflict in responses indicates a SCSI device is installed at the low ID and a narrow SCSI device is installed at the high ID of the test pair. To detect a future conflict between a narrow SCSI device at a high ID and a SCSI device installed in the future at an unused low ID, both the low ID and the high ID are called. No response to the high ID call in combination with a response to the low ID call indicates a narrow SCSI device is installed at the high ID and the narrow SCSI device would conflict in the future with a SCSI device subsequently installed at the unused low ID.

19 Claims, 7 Drawing Sheets

DETECTION OF SCSI DEVICES AT ILLEGAL LOCATIONS

BACKGROUND OF THE INVENTION

1. Field of the Invention

This invention relates to the detection of SCSI (small computer system interface) devices installed at illegal locations on a SCSI bus. In particular, the invention relates to detecting in a mixed environment of eight bit SCSI devices and sixteen bit SCSI devices the eight bit SCSI devices installed at SCSI bus address-identified locations intended for sixteen bit SCSI devices.

2. Description of Related Art

First generation SCSI devices were eight bit devices and were addressed on a SCSI bus with an address ID of 0 through 7. With the advent of sixteen bit SCSI devices and larger peripheral systems particularly storage systems, the address ID for SCSI devices expanded from 0 through 7 to 0 through 15. With both sizes of SCSI devices available, narrow (8 bit) and wide (16 bit), computer users often mix narrow and wide SCSI devices as they upgrade their system.

In a peripheral system with mixed narrow and wide SCSI devices, a problem of conflicts in address may occur if the SCSI devices are not properly installed in the system. A narrow SCSI device will only correctly recognize it is being addressed if it is located at an address slot with an ID between 0 and 7. If a narrow SCSI device is installed in a slot with an address ID of 8 to 15, the narrow device will not recognize the high order ID address bit. Accordingly, a narrow SCSI device installed at ID's 8 through 15 will configure itself to respond to a SCSI address line for ID 0 through 7. For example, a narrow device installed at slot ID 8 will define itself as a SCSI device ID 0. When a controller activates the ID 0 address line, it will get a response from a SCSI device actually located at slot 0 and a conflicting response from the narrow device at slot 8 that thinks it is an ID 0 SCSI device. This will create bus conflicts and corrupt data.

This problem can be avoided if the user only installs narrow SCSI devices in slots 0 through 7. However, it frequently happens that the user incorrectly installs a narrow device in slots 8 through 15. In other words the narrow SCSI device is at an illegal location and has an illegal ID. The problem is how to detect SCSI devices installed at illegal locations.

SUMMARY OF THE INVENTION

In accordance with this invention the above problem has been solved by (1) detecting a narrow SCSI device installed at a high ID and aliasing to a low ID that matches a controller ID bus address for the controller attached to the SCSI bus, (2) detecting a narrow SCSI device installed at a high ID and aliasing to a low ID address corresponding to a slot where another SCSI device is installed, and (3) detecting a narrow SCSI device installed at a high ID and aliasing to a low ID address corresponding to an unused slot where another SCSI device may be installed in the future.

A set module sets high ID and low ID address pairs as test pairs for the SCSI subsystem. The low ID is the alias of the high ID if a narrow SCSI device is installed at the high ID slot. A first address module calls a nonresponsive ID bus address corresponding to a slot known to be unused. A first test module detects a response when the first address module calls the nonresponsive ID bus address. This response indicates a narrow SCSI device is installed at the high ID of the test pair and the narrow SCSI device has configured to an alias bus address matching the controller ID.

A second address module generates a call to the low ID bus address in the test pair. A second test module detects a conflict in responses when the second address module calls the low ID. The conflict indicates a SCSI device is installed at the low ID and a narrow SCSI device is installed at the high ID of the test pair.

A third address module generates a call to the high ID bus address in the test pair. A third test module detects no response to the call from the third address module and detects a response to the call from the second address module. This combination of response and no response indicates a narrow SCSI device is installed at the high ID and the narrow SCSI device would conflict in the future with a SCSI device subsequently installed at the unused low ID.

In another feature of the invention a module responsive to the first test module isolates the narrow SCSI device at the high ID conflicting with the controller ID in order to disconnect this narrow SCSI device from the SCSI bus.

In another feature of the invention a module updates the high/low ID test pair to a new test pair until all test pairs have been tested.

The great advantage and utility of the present invention is narrow SCSI devices improperly installed in a slot for wide SCSI devices may be detected. This will prevent data corruption and parity errors due to conflicts while allowing the SCSI subsystem to continue to operate. The foregoing and other features, utilities and advantages of the invention will be apparent from the following more particular description of a preferred embodiment of the invention as illustrated in the accompany drawings.

DETAILED DESCRIPTION OF PREFERRED EMBODIMENTS

Figure 1:
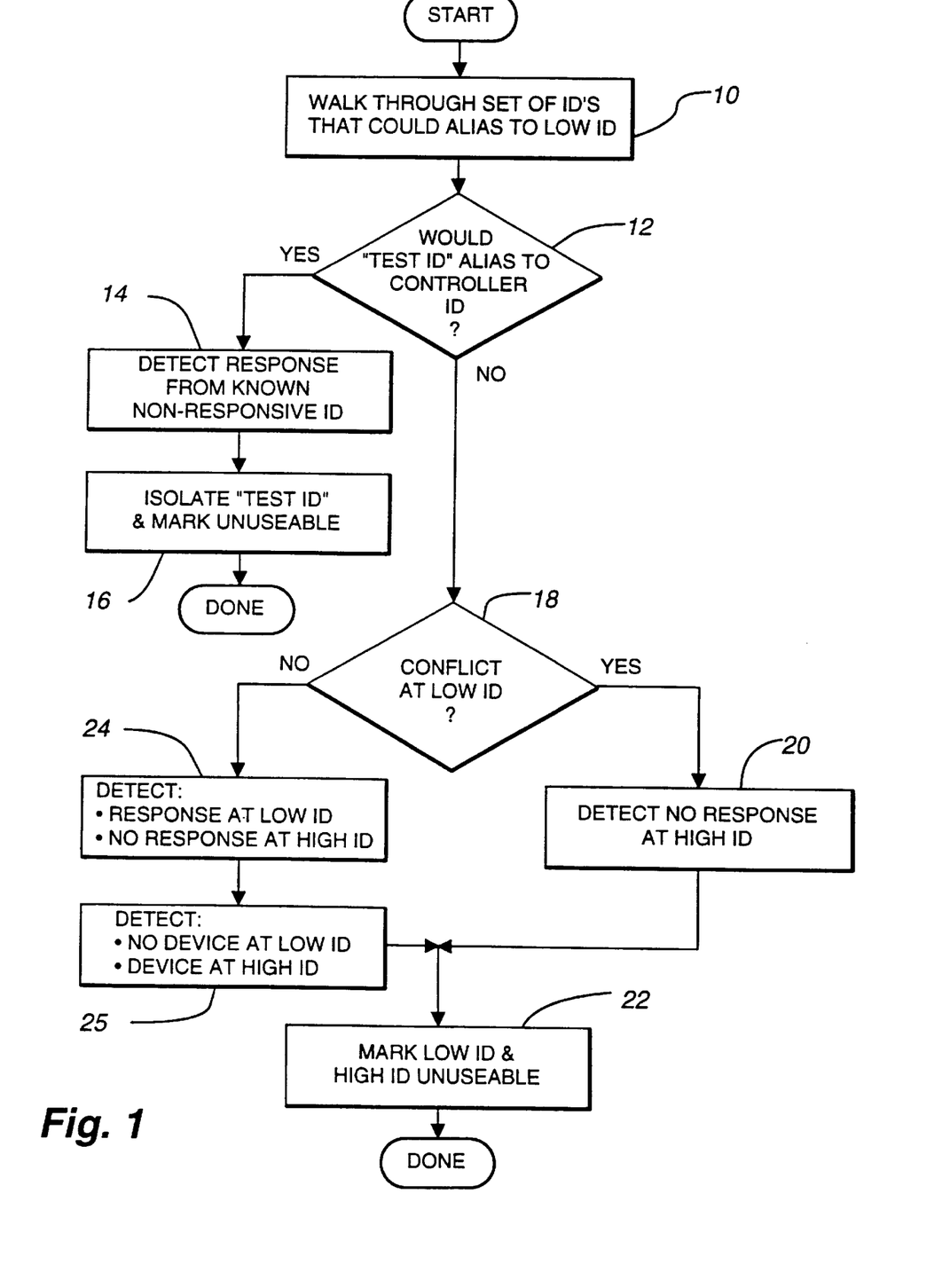
FIG. 1 shows logical operations performed to implement a preferred embodiment of the invention to detect a SCSI device at an illegal ID.

FIG. 1 illustrates the logical operations in a preferred embodiment of the present invention. To determine when a SCSI device is installed at an illegal location, there are three basic conflict situations that must be detected. First, the operations must detect a conflict between a narrow SCSI device at a high ID (ID address addressable for a wide SCSI device) and a SCSI device at a low ID (ID address addressable for a narrow or wide SCSI device) to which the high ID aliases. Alias of high ID to a low ID refers to the low ID address that a narrow SCSI device would set up to recognize if the narrow device is installed in a high ID slot on the SCSI bus. Second, the operations must detect a potential conflict between a narrow SCSI device at a high ID and no SCSI device at the alias low ID. This is a potential conflict in that there will be a conflict in the future when a SCSI device is installed at the alias low ID. Third, the operations must detect a conflict between a narrow device installed at a high ID and a controller using the low ID to which the high ID device aliases.

The logical operations begin in FIG. 1 at operation 10 which provides a set of "test IDs" to be checked for conflict situations. Operation 10 uses bit maps indicating the location of SCSI devices at high ID locations on the SCSI bus that could alias to a low ID. For example if the high IDs are 8 through 15 but only slots for IDs 8,9, and 11–14 are occupied, then only IDs 8, 9, 11–14 and their alias IDs would be in the test set of IDs. Alternatively, all IDs could be tested and the test results compared to the bit maps indicating the location of SCSI devices. The bit maps confirm the test results in this alternative.

After operation 10, decision operation 12 tests whether the test ID aliases to an ID location for a controller. In a SCSI bus with 0–15 IDs, the controllers are usually located at ID 6 and ID 7. Accordingly a narrow SCSI device at test ID 14 or ID 15 could alias to a controller ID. If the SCSI bus has only one controller, the logical operations in FIG. 1, which are performed in the controller, would know whether the controller is at ID 6 or ID 7. If the test ID does alias to a controller ID, the operation flow branches to detect operation 14.

The detect operation 14 causes the controller to call an ID that is known to be non-responsive. The form of the call includes the controller ID as well as the target ID. If the target ID is for a location that is known to be unused or disabled, there should be no response to the call. If there is a response, then detect operation 14 detects the response. Such a response indicates that there is a slot with an installed SCSI device that has configured its ID address to be the same as the controller's. In particular, there is a narrow SCSI device at the test ID that has caused the test ID to alias to the controller ID.

When operation 14 detects a response, then isolate operation 16 isolates the test ID from the SCSI bus and marks the test ID as unusable. The isolation of the test ID is necessary since all actions on the bus by the controller will contain the controller ID which would trigger an improper response from the narrow drive at the test ID aliasing to the controller ID. Isolating the narrow SCSI device at the test ID location will likely require disabling a segment of the SCSI bus. If the segment contains more than one ID location, SCSI devices at those locations will also be cut off from the bus and marked as unusable.

For all test IDs, that do not alias to a controller ID, the operation flow branches "No" at operation 12 to conflict decision operation 18. Operation 18 tests for a conflict on the SCSI bus in response to a call to the low ID. A bus conflict results if two SCSI devices are responding to a call from the controller. The two responses are mixed on the bus, and a bus conflict manifests itself as a parity error in the response on the bus. A bus conflict at a low ID occurs if there is a SCSI device at the low ID and a narrow SCSI device at the high ID. For all test IDs that produce a bus conflict at the low ID, the logical operation flow branches "Yes" to detect operation 20. Detect operation 20 causes the controller to send a call at the high ID. Operation 20 tests for a response at the high ID. Since there was a conflict at the alias low ID, there should be no response detected at the high ID. Thus, operation 20 verifies the "Yes" result from operation 18. After operation 20, both the low ID and the high ID that aliases to the low ID are marked as unusable by operation 22.

If decision operation 18 does not find a bus conflict, the operation flow branches to detect operation 24. Detect operations 24 and 25 are testing for potential conflicts. Detect operation 24 detects that there was a response at the low ID and then generates a call to the high ID to detect no response at the high ID. Detect operation 25 detects from the bus map that there is no SCSI device at the low ID and there is a SCSI device at the high ID. This detection combination indicates there is no SCSI device at the low ID location and that a narrow SCSI device at the high ID location is responding at the alias low ID. After the combination of operations 24 and 25, mark operation 22 marks the low ID and high ID as unusable. In this way, a potential conflict in the future, when a SCSI device is installed at the low ID location, is prevented.

Figure 2:
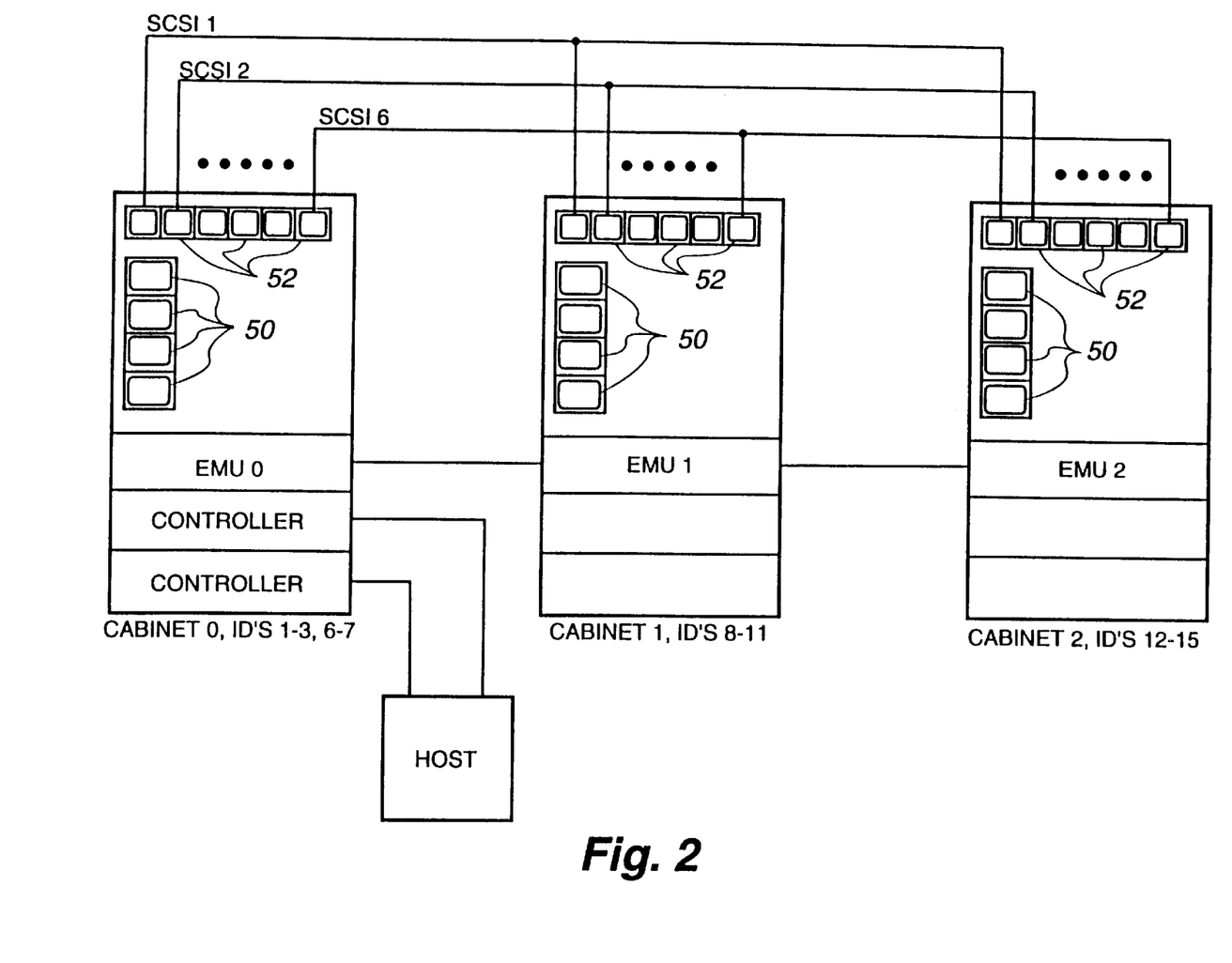
FIG. 2 shows an operating environment for a preferred embodiment of the invention wherein there are six SCSI buses with three segments and four SCSI devices in each segment.

An operating environment, as shown in FIG. 2, for the preferred embodiment of the invention is a system having multiple controllers (or initiators) and a plurality of SCSI devices connected to the controllers over a plurality of SCSI buses. The storage system in FIG. 2 has three cabinets, Cabinet 0, Cabinet 1 and Cabinet 2, for SCSI devices. Each cabinet can hold twenty four SCSI devices 50, for example hard disk drives, distributed over six SCSI buses, SCSI 1 through SCSI 6, with four SCSI devices per bus. Each SCSI bus has a bus extender chip 52 that enables the bus to be connected to the same bus in other cabinets. Since there are three cabinets and four SCSI devices 50 per SCSI bus per cabinet, there are twelve SCSI devices 50 per SCSI bus. The bus extender chips 52 are enabled or disable to effectively divide each SCSI bus into three segments with four SCSI devices per segment. The bus extender chip, designed by Digital Equipment Corporation and Symbios Logic, Inc., is a SYM53C120 chip available from Symbios Logic, Inc.

Each cabinet has an Environmental Monitor Unit (EMU) which is a small module having a small processor. The EMU performs some monitoring and control functions with respect to the SCSI devices and SCSI buses in the cabinet. The two functions, performed by the EMU in each cabinet, that are used by the present invention, are (1) the generation of a SCSI device bit map for the cabinet and (2) the "On/Off" control of the six bus extender chips 52 in the cabinet. The SCSI device bit map indicates which of the twenty four SCSI device slots in the cabinet are actually occupied by a SCSI device. In other words, each EMU generates a map where, for example, a binary one at a map location represents a SCSI device at the slot assigned to that map location. Conversely, a binary zero would indicate the slot is empty. The "On/Off" control of bus extender chips 52 is used to divide each SCSI bus into three segments. If bus extenders 52 in all cabinets are off then only SCSI bus segment 0, i.e. portion of SCSI bus in Cabinet 0 is active. By turning "On" bus extenders 52 in Cabinet 0 and Cabinet 1, segments 0 and 1 of the SCSI buses are active. By turning "On" bus extenders 52 in Cabinet 0 and Cabinet 2, segments 0 and 2 are active. When the bus extenders in all cabinets are "On", then all three segments are active.

EMU 0 in Cabinet 0 is the master EMU and communicates with EMU 1 and EMU 2 in Cabinets 1 and 2, respectively. EMU 0 is also communicating with Controller A and Controller B in Cabinet 0. The logical operations implementing the preferred embodiments of the invention are performed by Controllers working with the EMUs as will be described in detail hereinafter. All six SCSI buses are controlled from Controller A and Controller B. The controllers are only located in Cabinet 0. A single controller could be used, but reliability is enhanced by using two controllers.

Figure 3A:
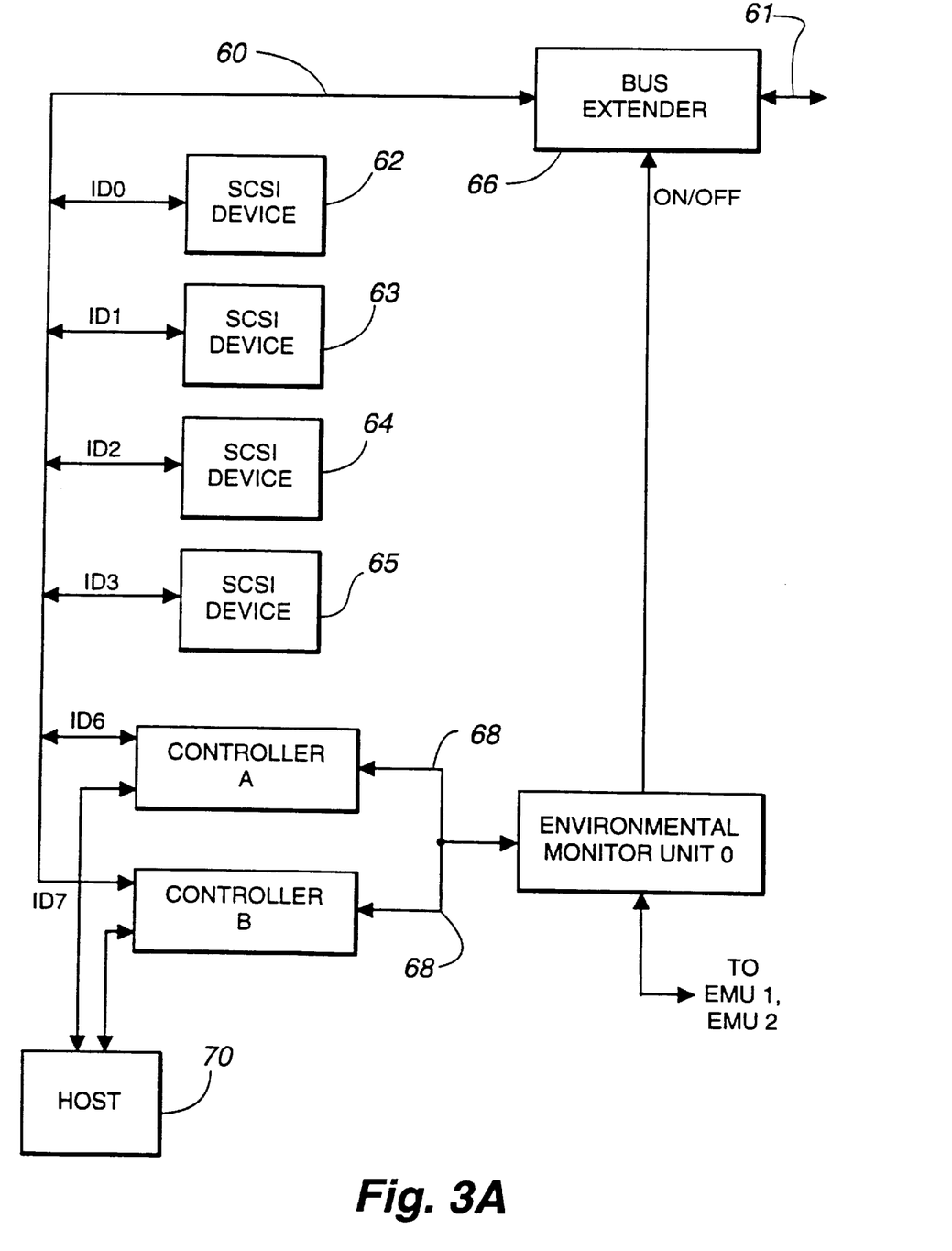
FIG. 3A shows the details of one SCSI bus in Cabinet 0 of FIG. 2.
Figure 3B:
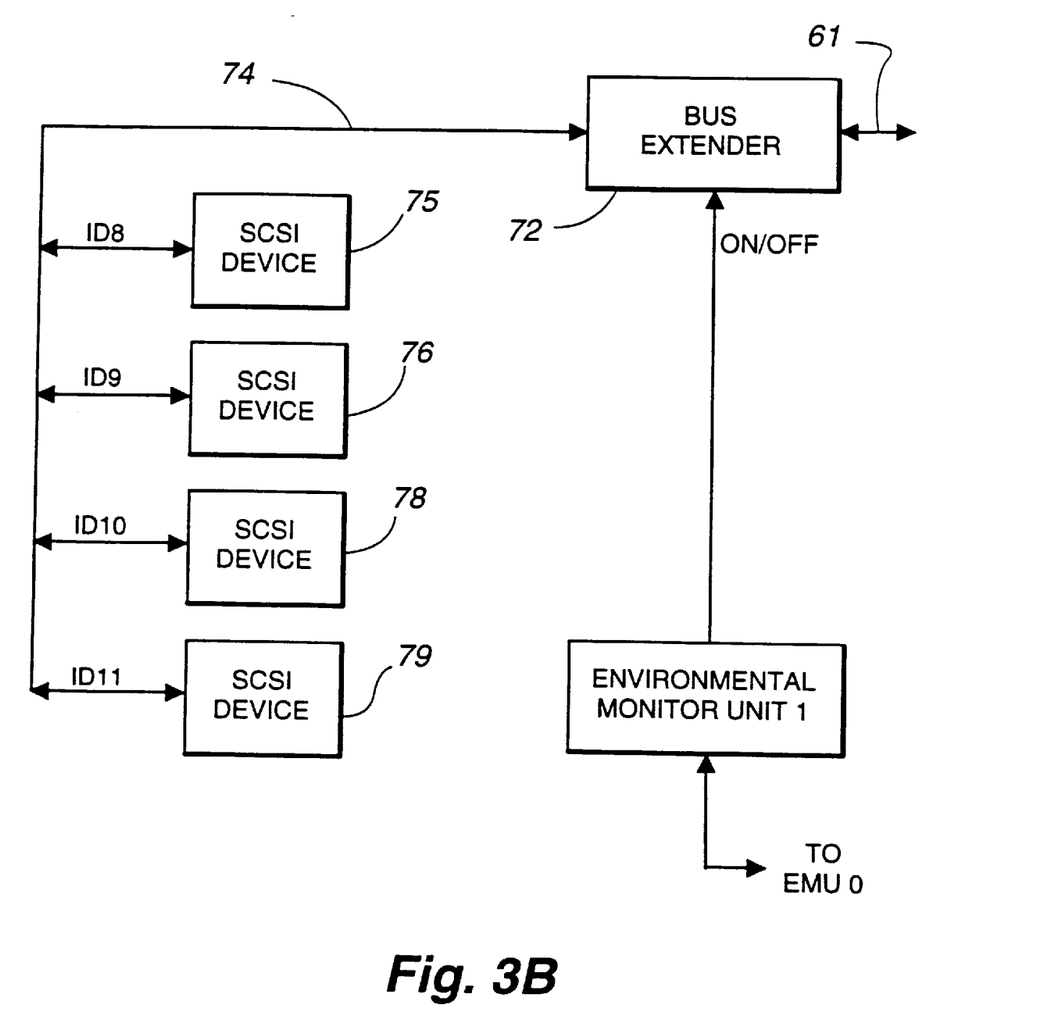
FIG. 3B shows the details of one SCSI bus in Cabinet 1 of FIG. 2.

The details for interconnecting SCSI devices with controllers on one SCSI bus are illustrated in FIG. 3A for Cabinet 0 and in FIG. 3B for Cabinet 1. FIGS. 3A and 3B also show the interconnection between EMUs, controllers and bus extenders. The SCSI bus and EMU connections in Cabinet 2, which are not shown, are structured like the connections in Cabinet 1 in FIG. 3B. Each of the six SCSI buses would be implemented as shown in FIGS. 3A and 3B.

In FIG. 3A, the internal SCSI bus 60 is connected to SCSI devices 62, 63, 64, 65, and to controller A and controller B. These SCSI devices would be located at slots where they would configure with SCSI bus ID's 0, 1, 2 and 3, respectively. Also attached to the internal SCSI bus 60 is controller A at SCSI bus address ID 6 and controller B at SCSI bus address ID 7.

The internal SCSI bus 60 is connected to SCSI 61 bus external to cabinet 0 through the bus extender chip 66. When the bus extender 66 is turned on, or is enabled, the internal SCSI bus 60 is connected the SCSI bus 61 external to cabinet 0. In effect, SCSI bus 60 is connected to SCSI buses inside cabinets 1 and 2 if their bus extenders are also turned on.

Enabling or disabling bus extender 66 is controlled by the environmental monitor unit 0 in cabinet 0. Environmental monitor unit 0 responds to a turn on or turn off command from controller A or controller B to turn bus extender 66 on or off. By separate cable the Environmental Monitor Unit 0 (EMU) is connected to EMU 1 in cabinet 1 and EMU 2 in cabinet 2. EMU 0 is the master EMU communicating information to, and gathering information from, EMU 1 and 2. For example, EMU 0 would obtain bit maps from EMU 1 for the portion of the SCSI bus in cabinet 1. Controller A and controller B inside cabinet 0 control all the SCSI devices in all the cabinets. Thus, controllers A and B in cabinet 0 call SCSI devices in cabinet 0 over the internal SCSI bus 60 and call SCSI devices in cabinets 1 and 2 over the external SCSI bus 61 Via SCSI bus 60. Controllers A and B communicate with the Master Environmental Unit EMU 0 over signal lines 68. And lastly, controller A and controller B communicate with the host computing system 70 to respond to requests from the host and provide responses from SCSI devices to the host. In a simpler system the controller function might be performed by the host in which case the SCSI bus connects directly to the host.

In FIG. 3B, bus extender 72 connects the external SCSI bus 61 to the internal SCSI bus 74 inside cabinet 1. Internal SCSI bus 74 in cabinet 1 is connected to each of the SCSI devices 75, 76, 78, and 79. These SCSI devices would be installed at slots that would normally configure the SCSI address location to ID 8, ID 9, ID 10 and ID 11, respectively.

To properly configure to these SCSI bus ID's, SCSI devices 75, 76, 78, 79 would have to be wide SCSI devices. As explained above, if the SCSI devices were narrow SCSI devices, they would configure as if they were at ID 0, ID 1, ID 2 and ID 3.

Bus extender 72 is enabled or disabled to connect, or isolate, bus 74 with bus 61 by the on/off control from Environmental Monitor Unit 1 (EMU 1). Environmental Monitor Unit 1 communicates with EMU 0 to receive commands from controllers A and B and to provide bit map information to controllers A and B. EMU 1 gathers the bit map data in cabinet 1 for the possible 24 SCSI devices (6 buses, four drives per bus) installed in cabinet 1. As mentioned earlier, the structure of the SCSI bus connections, bus extender and EMU connections in cabinet 2 would be the same as cabinet 1 except, of course, that the IDs are now ID 12, ID 13, ID 14 and ID 15 for the SCSI device locations. Also, in cabinet 2, the EMU is now EMU 2 rather than EMU 1.

Figure 4:
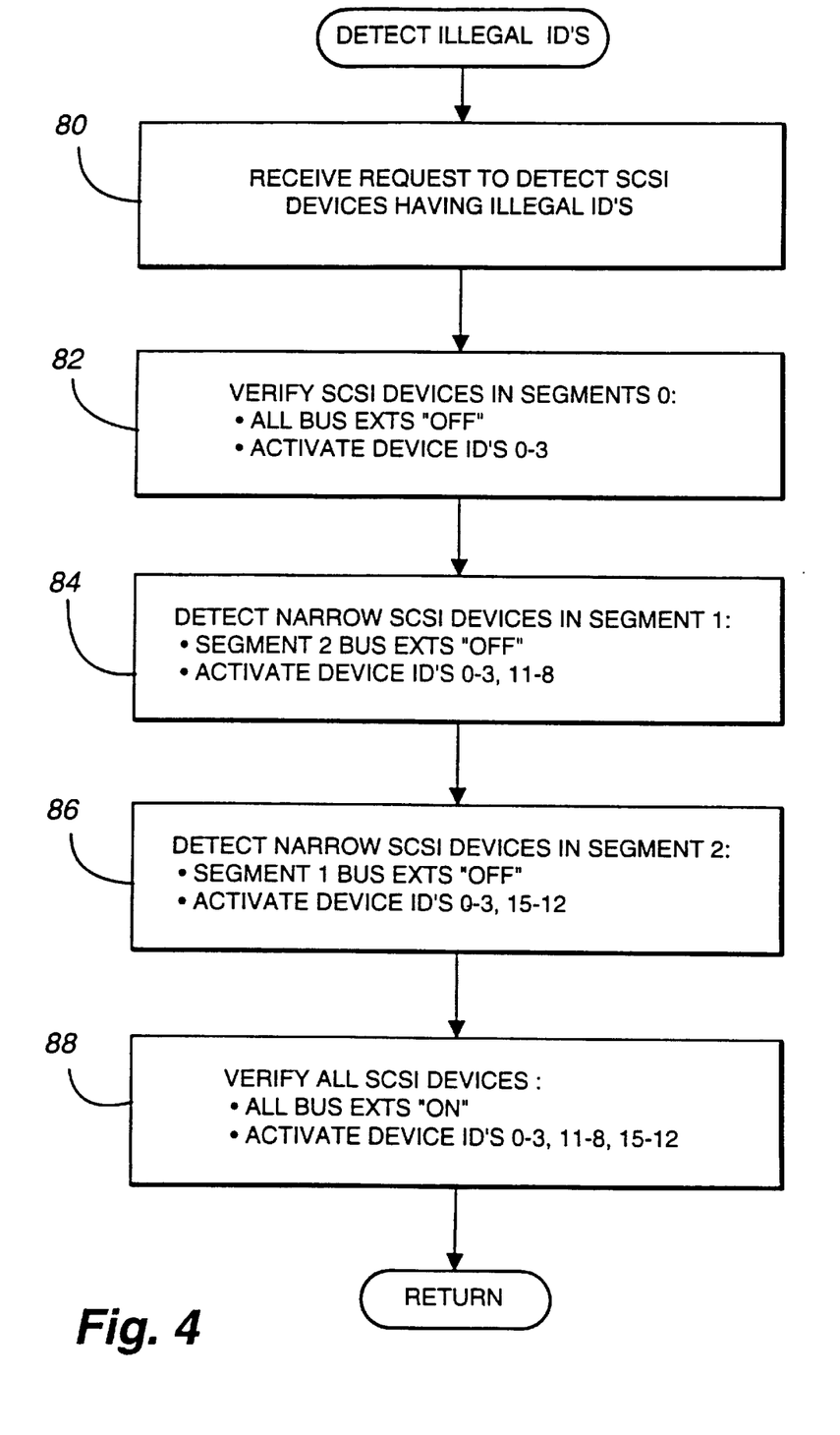
FIG. 4 illustrates the logical operations to implement a preferred embodiment of the invention in the operating environment of FIG. 2.

The logical operations performed by the controllers with the cooperation of the EMU's are shown for a preferred embodiment of the invention in FIG. 4. When the controllers are requested to detect SCSI devices at illegal ID locations, the logical operations begin at receive operation 80. When receive operation 80 recognizes a request to detect SCSI devices having illegal ID's, it starts a process of walking through calls to all of the SCSI device ID's of a SCSI bus to test for responses. Further, this walk-through process is organized by segments of the SCSI bus. In the preferred embodiment, the segmentation is done by the bus extenders.

Verify operation 82 verifies responses from SCSI devices in segment 0. Operation 82 first turns all the bus extenders off, effectively isolating the SCSI buses in segment 0 from the SCSI buses in segments 1 and 2. Then, verify operation 82 inquires, or calls, SCSI device ID's 0 through 3. The inquiry or call operation is looking for a response from a called ID and compares the existence of a response to the bit map for SCSI Devices in segment 0 (cabinet 0). The bit map should indicate the presence of a SCSI device, and every SCSI device present should produce a response to the call. The verify operation is also looking for errors, such as parity errors, from the SCSI devices to verify that the SCSI devices in segment 0 are operating correctly with the controllers. After verify operation 82 is complete, segment I detect operation 84 begins.

In segment 1 detect operation 84, only segment 2 bus extenders are turned off. Bus extenders in segment 0 and segment 1 are turned on. Accordingly, the SCSI devices on the bus in cabinet 0 are now connected with the SCSI devices in cabinet 1 and all of these devices are communicating with the controllers. The controllers now use the active or call operation to call each of the SCSI ID's 0–3 and 11–8. Whether ID's 11–8 are called from high to low or low to high is a matter of choice. Recall that if a narrow SCSI device is at ID location 8–11, it will configure as if it were at an ID 0–3. Therefore, when calls go out to ID's 0–3 and a bus conflict is detected, then a narrow drive has been detected at a high ID. The high ID's are also called so as to confirm that there is "No" response at a high ID. A "No" response at a high ID confirms a conflict at a low ID, or as explained in FIG. 1, indicates a potential future conflict with a future device low ID. The details for operations to detect narrow SCSI devices at a high ID will described hereinafter with reference to FIG. 6.

Detect operation 86 will detect narrow SCSI devices located in segment 2 (cabinet 2) that conflict either with controllers or with potential future SCSI devices installed at ID locations not currently used. The segment 2 detect operation 86 begins by turning off the segment 1 bus extenders and turning on segment 0 and segment 2 bus extenders. This will isolate segment 1 (cabinet 1) from the SCSI bus and permit the detect operation to work only with slot locations for IDs 0 through 3 and 15 through 12. If narrow SCSI devices were located at slots normally configuring to ID's 12 and 13, the narrow SCSI devices would configure to ID's 4 and 5. Narrow SCSI devices and slots normally configuring to ID's 14 and 15 would instead configure to alias ID's 6 and 7. Devices aliasing to ID 4 and ID 5 would be conflicting with potential future SCSI devices in future slots assigned to ID 4 and ID 5. Devices aliasing to ID 6 and ID 7 would conflict with controllers. The details for implementing the detection operations for segment 2 will be described hereinafter with reference to FIG. 6.

After the detection of narrow SCSI devices in segment 2, operation 88 verifies the operation of all SCSI devices. The verification begins by turning on all the bus extenders so that all segments of each SCSI bus are now active. The test operation then continues by activating SCSI device ID's 0–3 for segment 0, 8–11 for segment 1 and 12–15 for segment 2. All SCSI device operations should respond correctly or should have been disabled during operations 82, 84 and 86. The verification operation in 88 is simply to test that once all segments are on, the SCSI devices connected to the various SCSI buses are operating as expected.

Figure 5:
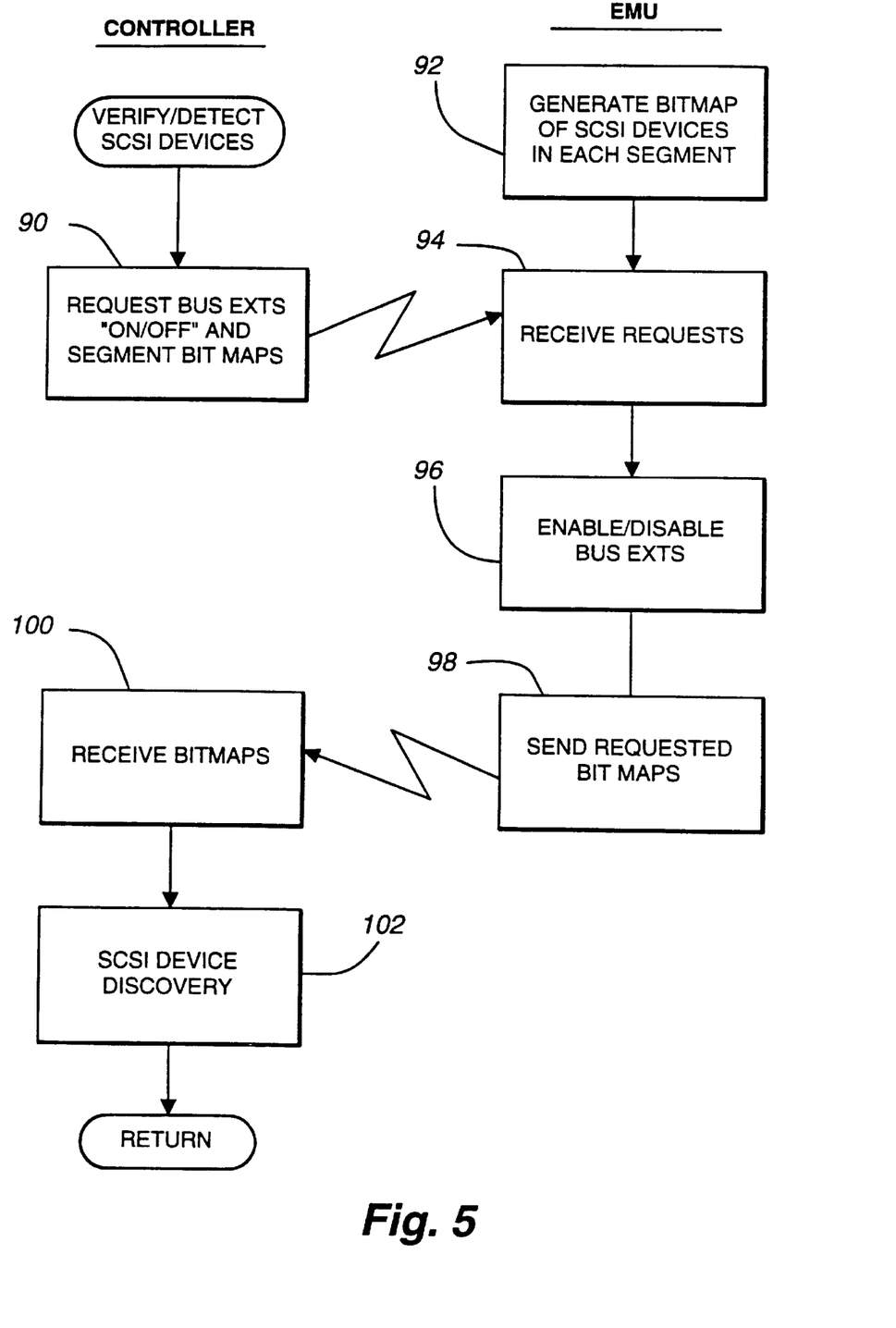
FIG. 5 shows the details of verify or detect operations in FIG. 4.

In FIG. 5, the detect SCSI devices operations 84 and 86 in FIG. 4 are shown in detail. When the host computer initiates the detect illegal IDs operation, the controller on each SCSI bus begins at request operation 90. Request operation 90 requests the bus extensions on and off, as appropriate, to the verify or detect operation in FIG. 4 that is taking place. If the detect operation 84 in FIG. 4 is being performed, the request operation would request bus extenders in segment 2 "off" and bus extenders in segments 0 and 1 "on". Also, the request operation requests the appropriate segment bit maps. For example, if detect operation 84 is the present operation, then the bit maps for segment 0 and segment 1 are the bit maps requested. These requests from request operation 90 are sent to the Environmental Monitor Units 0 and 1 (EMU 0 and EMU 1). The EMUs have already generated the bit map of SCSI devices in their cabinet in bit map generation operation 92. Each EMU and each segment generates the bit map for its particular segment. Receive operation 94 in EMU 0 receives the request from the controller or controllers. Depending upon which operation 84 or 86 in FIG. 4 is active and which segment of the SCSI bus are being tested, the requests are passed from EMU 0 to the appropriate EMU or EMUs 1 and 2 in segments 1 and 2.

The EMUs receiving the request passed from receive operation 94 will then enable or disable bus extenders in their segment by executing enable/disable operations 96. Similarly, the appropriate EMUs receiving the request for bit maps will then respond by send operation 98 sending the requested bit map back to the controller in cabinet 0. The controller at operation 100 receives the bit maps. With bit maps available and the bus extenders appropriately turned on or off, the SCSI device discovery operation 102 proceeds to detect SCSI devices at the various SCSI bus IDs to be tested. The details of the SCSI device discovery logical operations are shown in FIG. 6.

Figure 6:
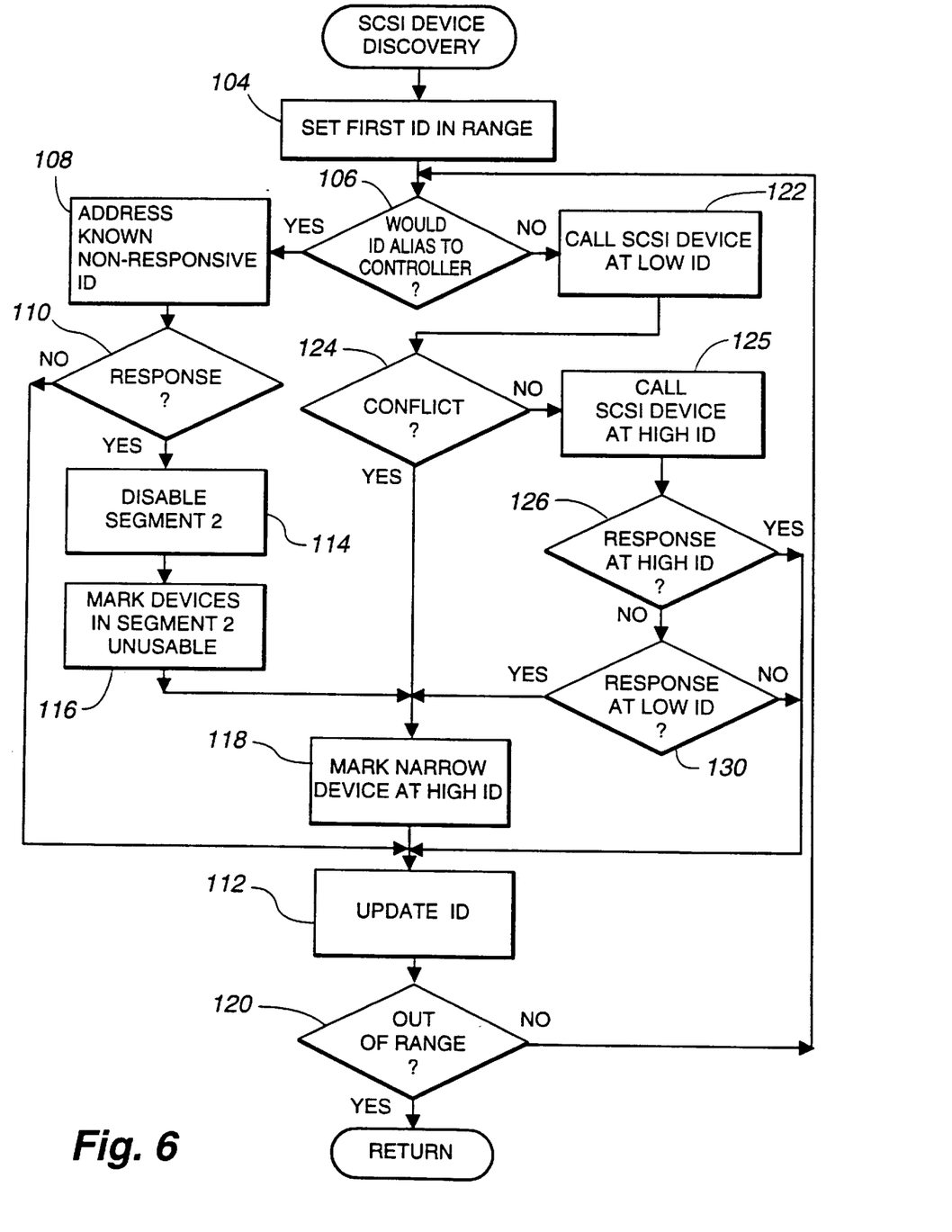
FIG. 6 shows the details of the device discovery operation in FIG. 5.

In FIG. 6 the logical operations begin with set operation 104 setting a first high ID and low ID pair to be tested. The pair is of course the high ID and the low ID to which the high ID would alias if a narrow SCSI device is installed at the high ID. It is a matter of choice as to whether the test operations begin at the top or bottom of a range of SCSI address IDs. Detection of SCSI devices aliasing to controller IDs is of primary importance since such a condition would prevent detection of narrow SCSI devices at other high IDs, as will be discussed hereinafter. Accordingly set operation 104, when detecting devices in segment 1, will set to a high/low ID pair—ID 8 and ID 0 or at the other end of the range to ID 11 and ID 3.

When detecting devices in segment 2, set operation 104 will first set to the high ID whose alias low ID matches the controller ID of the controller performing the tests. After that high ID is tested, set operation 104 will set to high ID and low ID combinations for high ID 12 and low ID 4 or high ID 13 and low ID 5. If there is a single controller on the SCSI bus, set operation 104 would also test the high/low ID combination pair where the high ID would alias to the other controller ID if the other controller were present.

If there are dual controllers on the SCSI bus, set operation 104 for the first controller testing the high/low ID combination pairs in segment 2 will set all high/low ID pairs except for the high ID that aliases to the low ID which is the second controller's ID. The first controller will then tell the other controller on the SCSI bus to test the high ID and low ID combination pair where a narrow SCSI device at the high ID would conflict with the second controller's ID. Alternatively, the first controller testing the high/low ID pairs could tell the second controller not to respond if it saw its ID and then make the high/low ID pair test for the second controller.

Decision operation 106 detects when the set operation 104 has set a high/low ID pair where the high ID would alias to, i.e. the low ID matches, the ID of the controller. The controller IDs are ID 6 and ID 7. If the low ID matches the ID of the controller, the operations branch "Yes" to address operation 108. Address operation 108 causes the controller to address a known, non-responsive ID location. A known, non-responsive ID can be an ID in a segment that is disabled by the bus extenders in the segment being turned off. Also a known, non-responsive ID could be ID 4 or ID 5 which are known to be unused.

Response decision operation 110 is looking for a response after address operation 108 has caused the controller to call what should be a nonresponsive address. If there is no response, then there is no problem at the high/low ID pair under test, and the operation flow passes to update ID operation 112. However, if a narrow SCSI device is at the high ID slot under test, it will have configured itself to respond at the low ID matching the controller ID. Accordingly, the call from the controller will produce a response because the narrow SCSI device sees the controller ID in the call from the controller. For example, if a wide SCSI device is in the slot for ID 15 and a controller at ID 7 generates a call to ID 4, then the call which includes source address, ID 7, and target address, ID 4, will produce no response at SCSI ID 4. However, if a narrow SCSI device is installed at slot ID 15 and configured to alias ID 7, the narrow SCSI device will see the ID 7 in the call and will respond. Accordingly, if decision operation 110 sees a response, the operation has detected a narrow SCSI device aliasing to the controller ID.

When a response is detected by operation 110, disable operation 114 isolates the problem high ID slot with the narrow SCSI device and disconnects it from the SCSI bus. Since any call from the controller would always produce a response from the narrow SCSI device at the problem high ID slot irrespective of the SCSI ID being addressed, the problem high ID slot with the narrow SCSI device must be isolated or disconnected from the SCSI bus. Once the narrow SCSI device is removed from the high ID slot, there is no further need to isolate the high ID slot. In the present embodiment, the narrow SCSI device aliasing to a controller ID is in segment 2 (cabinet 2). Since there is no way in the preferred embodiment to isolate a single SCSI device, the only available action is to isolate the segment containing the narrow SCSI device. Accordingly, disable operation 114 turns off the bus extender for segment 2 until the narrow SCSI device aliasing to the controller ID Is removed. Since the bus extender for segment 2 is turned off, mark operation 116 marks all SCSI devices in segment 2 as unusable. In addition mark operation 118 marks the SCSI device at the high ID under test as a narrow device.

After the narrow SCSI device is marked, update operation 112 increments or decrements the high/low ID pair depending on whether the test process is moving through the test range from low to high or high to low. Decision operation 120 tests whether the updated ID pair is still within the test range or is outside the test range. If the new high/low ID pair is within range, the logical operations return to decision operation 106 to begin the test for the new ID pair. Of course if the new ID pair is out of range, then the device discovery operations are complete, and the operation flow returns to FIG. 5 which returns to FIG. 4 for the next detect or verify operation.

If the updated high ID does not alias to a controller ID, then the operation flow in FIG. 6 branches "No" from decision operation 106 to call operation 122. Call operation 122 causes the controller to generate a call from the controller to the low ID in the high/low ID pair under test. Call operation also stores whether or not there was a response at the low ID. If the call in operation 122 results in a conflict, conflict detect operation 124 detects the conflict and the operation flow branches "Yes" to mark operation 118. A conflict detected means that two SCSI devices in separate slots responded to the call. In effect a SCSI device at the low ID responded, and at the same time a narrow SCSI device at the high ID responded. Accordingly mark operation 118 marks the narrow SCSI device at the high ID.

If no conflict is detected by detection operation 124, there are two possibilities. First, the SCSI device at the high ID is a wide SCSI device and thus is properly installed. Second, a narrow SCSI device is at a high ID slot and is aliasing to a low ID, and no SCSI device is installed at the alias low ID location. This latter possibility is the potential future conflict, i.e. a conflict would occur in the future if a SCSI device is installed at the low ID location.

Call operation 125 addresses the high ID and stores whether or not there was a response at the high ID. Decision operation 126 tests for a response at the high ID. If there is a response at the high ID, the SCSI device at the high ID in the high/low ID pair under test must have been properly installed, and the operation flow passes to update operation 112.

If decision operation 126 does not detect a response at the high ID, decision operation 130 tests whether call operation 122 produced a response at the low ID. If there was no response at the low ID as well, then there are no device installation faults, and update operation 112 updates the ID pair under test. If there is a response at the low ID, decision operation 130 branches "Yes" to mark operation 118 to mark a narrow SCSI device at a high ID. For example, with no device at ID 2 and a narrow SCSI device at the slot for ID 10, decision operation 126 will detect no response at the high ID 10, but decision operation 130 will detect a response at the alias low ID 2. Accordingly, mark operation 118 will mark a narrow SCSI device at high ID 10.

After all high/low ID pairs for segment 1 or segment 2 have been tested, decision operation 120 will return the operation flow to FIG. 5 and thereby to FIG. 4 for the next verify or detect operation in FIG. 4. After all verify or detect operations for all SCSI buses are complete, the test for SCSI devices at illegal locations is complete.

While a plurality of embodiments for implementing the invention have been described, it will be appreciated that any number of additional variations or alterations in the elements used to implement the invention may be made and are within the scope of the invention as claimed hereinafter.

We claim:

1. In a computing system having a plurality of computing system interface devices connected to a host computer through a computing system interface bus and one or more controllers on the bus, said plurality of devices being configurable to actual or alias bus addresses depending on whether the device is installed in a correct or illegal slot attached to the bus, a method for detecting computing system interface devices installed in illegal slots, said method comprising the computer implemented steps of:

first detecting a computing system interface device installed in an illegal slot that configures the device to an alias bus address that conflicts with a controller bus address; and second detecting a computing system interface device installed in an illegal slot that configures the device to an alias bus address that conflicts with an actual bus address corresponding to the alias bus address.

2. The method of claim 1 wherein said first detecting step further comprises the computer implemented steps of:

addressing a non-responsive bus address;

detecting a response to said addressing step whereby the response indicates a computing system interface device installed in a slot, where the device configures to an controller bus address.

3. The method of claim 2 and in addition the step of:

isolating from the bus the computing system interface device configured to the controller bus address.

4. The method of claim 1 wherein said second detecting step further comprises the computer implemented steps of:

conflict detecting a conflict between a response from a computing system interface device installed in a slot, where the device configures to an actual bus address, and a response from a computing system interface device installed in a slot where the device configures to an alias bus address that matches said actual bus address; and potential conflict detecting a potential future conflict between a response from a computing system interface device installed in a slot, where the device configures to an alias bus address, and a future response from a computing system interface device installed in the future at a present empty slot at an actual bus address corresponding to the alias bus address.

5. The method of claim 4 wherein said potential conflict detecting step comprises the steps of:

first addressing a first actual bus address corresponding to the alias bus address and detecting a response in response to said first addressing step;

second addressing a second actual bus address where a computing system interface device illegally installed at the second bus address would configure to the first actual bus address and detecting no response to said second addressing step; and detecting no computing system interface device installed at the first actual bus address.

6. In a computing system having small computing system interface (SCSI) subsystem connecting a plurality of SCSI devices through a SCSI bus to a subsystem controller in the computing system; said plurality of SCSI devices being of at least two types, wide and narrow, wide SCSI devices configurable to an actual ID bus address when the wide SCSI device is installed at either a low ID slot or a high ID slot attached to the SCSI bus, narrow SCSI devices configurable to an actual low ID bus addresses when installed in a low ID slot and configurable to an alias low ID bus address when installed in a high ID slot; a method for detecting narrow SCSI devices installed in high ID slots comprising the steps of:

first detecting a narrow SCSI device installed at a high ID and aliasing to a low ID that matches a controller ID bus address for the controller attached to the SCSI bus;

second detecting a narrow SCSI device installed at a high ID and aliasing to a low ID address corresponding to a slot where another SCSI device is installed; and third detecting a narrow SCSI device installed at a high ID and aliasing to a low ID address corresponding to an unused slot where another SCSI device may be installed in the future.

7. The method of claim 6 and in addition the step of:

setting high ID and low ID address pairs as test pairs for the SCSI subsystem, said low ID being the alias of the high ID if a narrow SCSI device is installed at the high ID slot.

8. The method of claim 7 wherein said first detecting step comprises the steps of:

detecting the low ID in the test pair matches the controller ID;

calling a non-responsive ID bus address corresponding a slot known to be unused; and testing for a response to said addressing step, the response indicating a narrow SCSI device is installed at the high ID of the test pair and the narrow SCSI device has configured to an alias bus address matching the controller ID.

9. The method of claim 8 and in addition the step of:

isolating the narrow SCSI device at the high ID to disconnect this narrow SCSI device from the SCSI bus.

10. The method of claim 9 and in addition the step of:

marking the narrow SCSI device at the high ID and indicating the high ID is unusable.

11. The method of claim 7 wherein said second detecting step comprises the steps of:

calling the low ID bus address in the test pair;

detecting a conflict in responses to said calling step, the conflict indicating a SCSI device is installed at the low ID and a narrow SCSI device is installed at the high ID of the test pair.

12. The method of claim 11 and in addition the steps of:

marking the narrow SCSI device at the high ID; and marking the high ID and low ID in the test pair as unusable.

13. The method of claim 7 wherein said third detecting step comprises the steps of:

first calling the low ID bus address in the test pair;

second calling the high ID bus address in the test pair;

detecting no response to said second detecting step; and detecting a response to said first detecting step, a combination of response to said first calling step and no response to said second calling step indicating a narrow SCSI device is installed at the high ID and would conflict in the future with a SCSI device subsequently installed at the unused low ID.

14. The method of claim 13 and in addition the steps of:

marking the narrow SCSI device at the high ID; and marking the high ID and low ID in the test pair as unusable.

15. The method of claim 7 and in addition the steps of:

updating the test pairs to a new test pair after completing said detecting steps for a previous test pair; and repeating the updating and detecting steps until all test pairs have been tested.

16. In a computing system having small computing system interface (SCSI) subsystem connecting a plurality of SCSI devices through a SCSI bus to a subsystem controller in the computing system; said plurality of SCSI devices being of at least two types, wide and narrow, wide SCSI devices configurable to an actual ID bus address when the wide SCSI device is installed at either a low ID slot or a high ID slot attached to the SCSI bus, narrow SCSI devices configurable to an actual low ID bus addresses when installed in a low ID slot and configurable to an alias low ID bus address when installed in a high ID slot; apparatus in the controller for detecting narrow SCSI devices installed in high ID slots comprising:

a set module setting high ID and low ID address pairs as test pairs for the SCSI subsystem, said low ID being the alias of the high ID if a narrow SCSI device is installed at the high ID slot;

a first address module calling a non-responsive ID bus address corresponding a slot known to be unused;

first test module detecting a response when said first address module calls the non-responsive ID bus address, the response indicating a narrow SCSI device is installed at the high ID of the test pair and the narrow SCSI device has configured to an alias bus address matching the controller ID;

a second address module generating a call to the low ID bus address in the test pair;

a second test module detecting a conflict in responses when said second address module calls the low ID, the conflict indicating a SCSI device is installed at the low ID and a narrow SCSI device is installed at the high ID of the test pair;

a third address module generating a call to the high ID bus address in the test pair;

a third test module detecting no response to the call from said third address module and detecting a response to the call from said second address module, this combination of response and no response indicating a narrow SCSI device is installed at the high ID and the narrow SCSI device would conflict in the future with a SCSI device subsequently installed at the unused low ID.

17. The apparatus of claim 16 and in addition:

a module marking the narrow SCSI device at the high ID.

18. The apparatus of claim 17 and in addition:

a module responsive to said first test module for isolating the narrow SCSI device at the high ID conflicting with the controller ID in order to disconnect this narrow SCSI device from the SCSI bus.

19. The apparatus of claim 16 and in addition:

a module updating the test pair to a new test pair until all test pairs have been tested.

* * * * *